Patented June 6, 1939

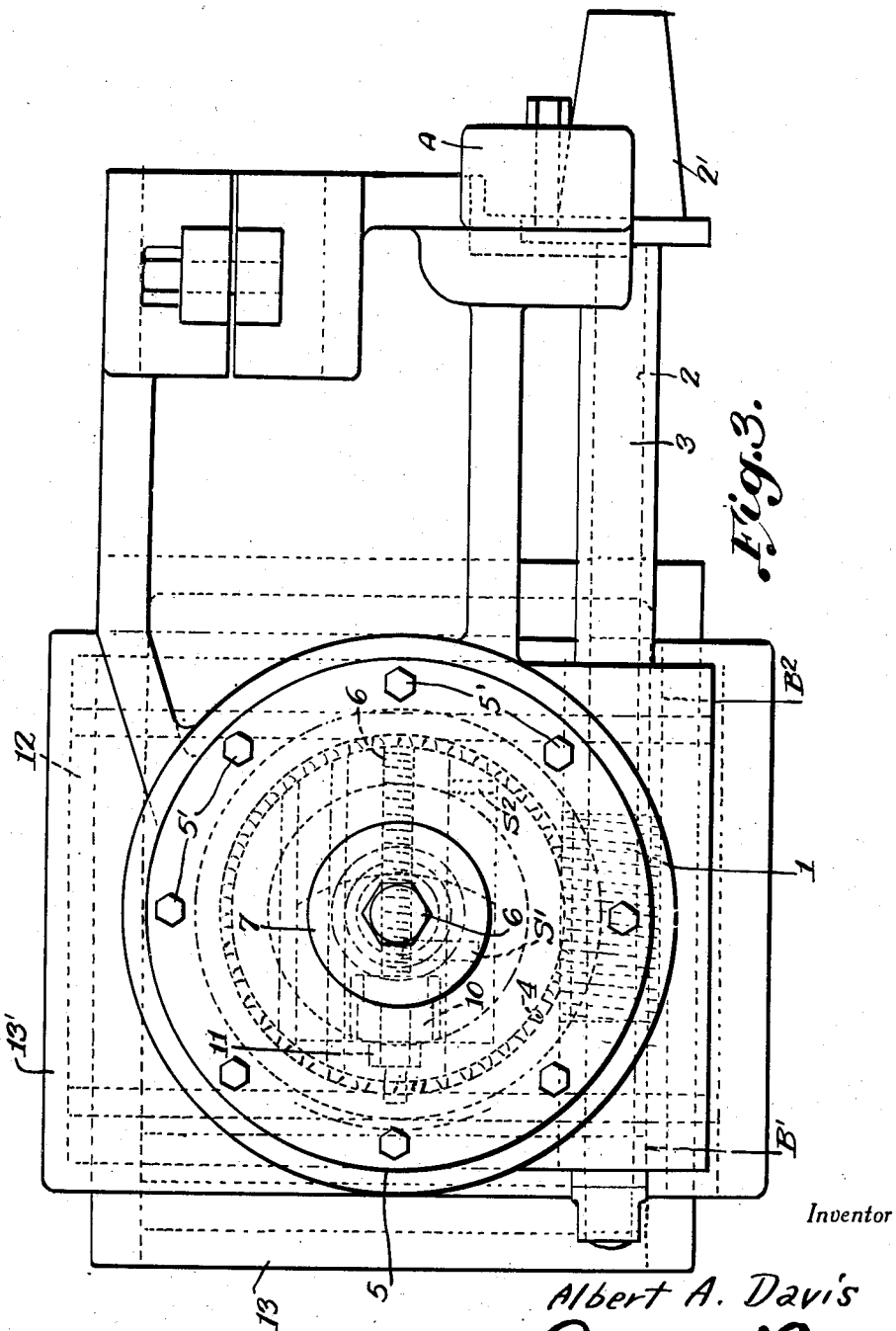

2,161,505

UNITED STATES PATENT OFFICE 2,161,505

RADIAL DRAFT MILLING APPARATUS

Albert A. Davis, Alliance, Ohio, assignor of one-half to Carl E. Beltz, Limaville, Ohio Application March 5, 1938, Serial No. 194,202

10 Claims. (Cl. 90—15)

This invention relates to new and useful improvements in machines for milling perfect round and radial draft with efficiency and accuracy, the present invention being adapted for use in drop forging, die casting, Bakelite and hard rubber molding and allied die work.

An important object of the invention is to provide a machine of the character stated which can be operated with precision and which will be substantially fool-proof in operation.

Other important objects and advantages of the invention will become apparent to the reader of the following specification.

In the drawings:—

Figure 3 is a side elevational view.

Figure 1:
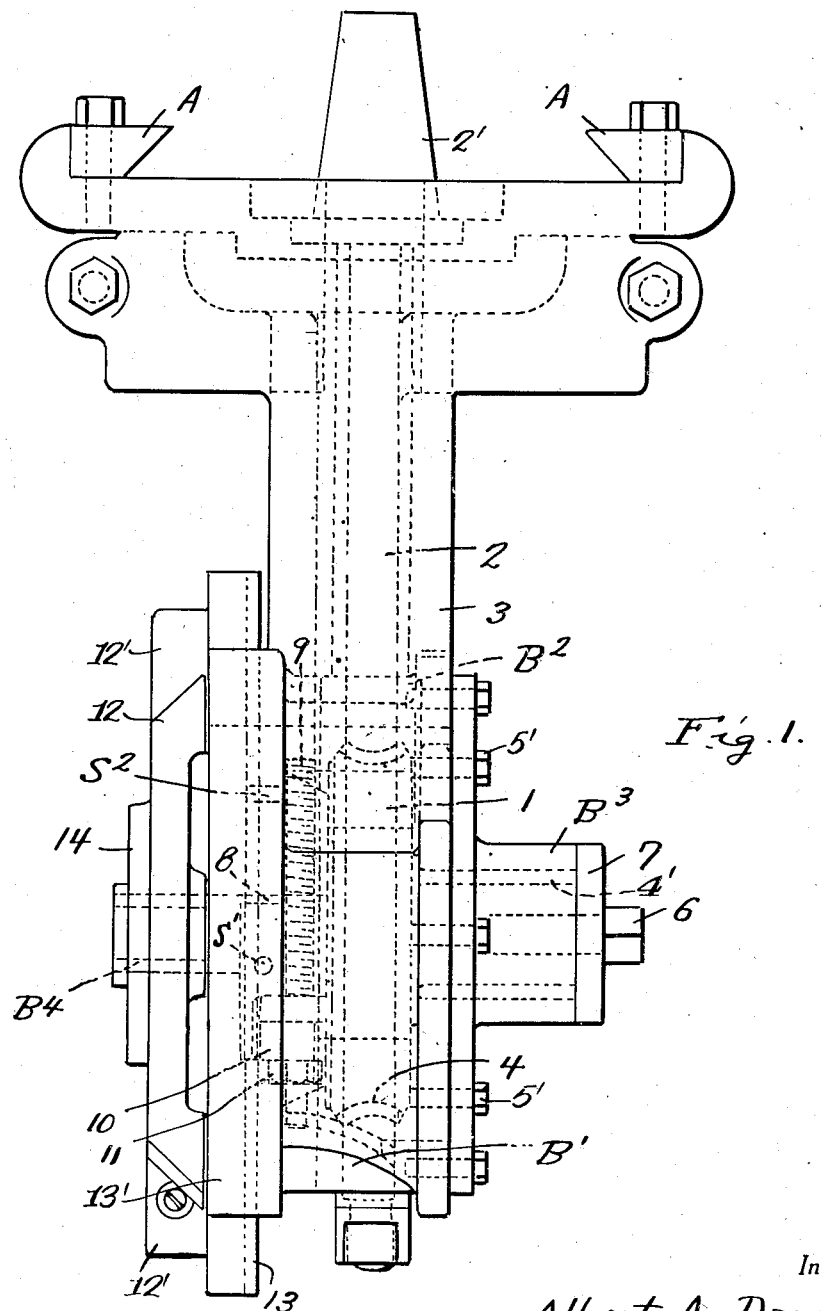
Figure 1 represents a top plan view of the apparatus.
Figure 2:
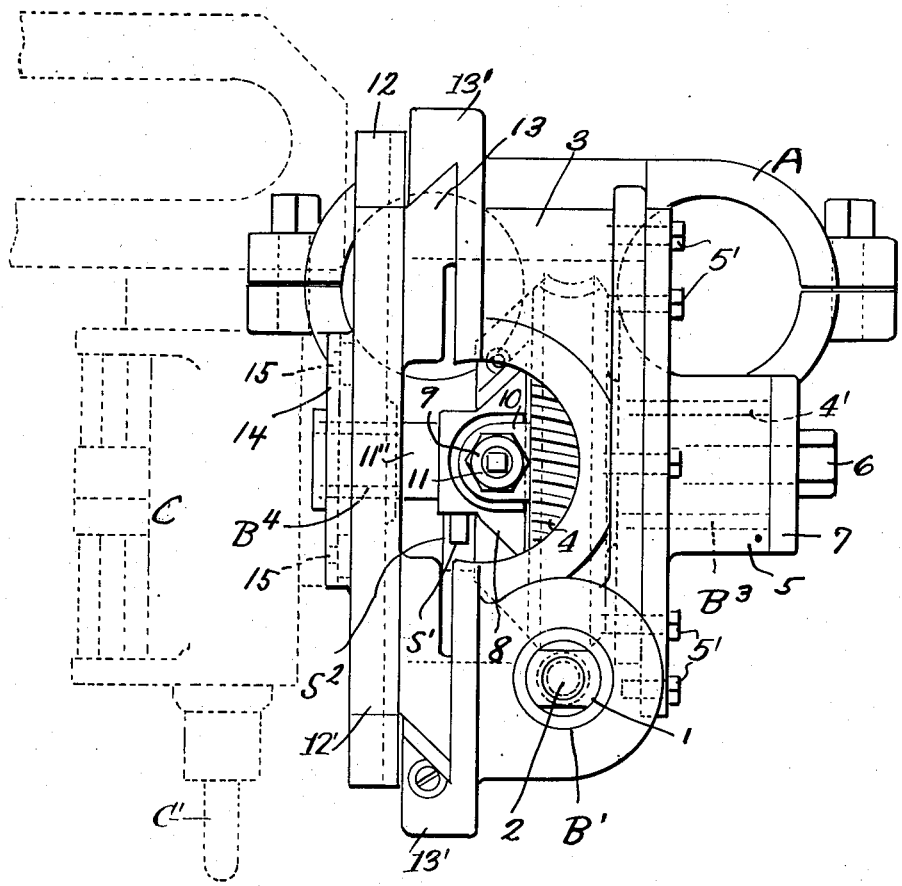
Figure 2 is an end elevational view.

Referring to the drawings wherein like numerals designate like parts, it can be seen in the drawings that numeral 1 denotes a worm carried on the usual milling machine arbor 2 which in carrying out the present invention is supported in the rigid main casting 3 by the bearings B' and B2. This worm 1 meshes with the worm gear 4 fast on a shaft 4' journaled in a bearing B3 in the casting 5 and this casting is held on the rigid main casting 3 by stud bolts 5'.

The shaft 4' of the worm gear 4 is held in place horizontally by the stud bolt 6 extending through the washer 7. The worm gear 4 has on the side thereof opposite from the bearing B3 a dovetailed slide 8 settable diametrically of said gear in guides 8' on the latter under control of the adjusting screw 9, which screw is held in position by the lock nut 11 operative against the boss 10. The dovetailed slide 8 is provided with a cylindrical headed stud 8'' on its outermost face which rotates in a bearing B4 in the dovetailed slide 12.

This dovetailed slide 12 operates vertically in guides 12' provided on a dovetailed slide 13 which operates horizontally guides 13' provided on the rigid main casting 3.

The main casting 3 is held to the conventional type milling machine by rigid supports A. These supports may be varied in construction according to the different makes and types of horizontal and vertical milling machines with which my improvements will be used. The arbor 2 is provided with a pilot 2' for insertion in the usual driving chuck (not shown) of the milling machine.

A circular boss 14 is provided on the dovetailed slide 12 having T-slots 15 therein for bolting to said slide a milling attachment C including a milling tool C'. This mounting means may be varied to hold various makes and types of milling attachments. Stop S' and S2 are provided on the dovetailed slide 8 and on the main casting 3, respectively, for coaction under adjustment of said slide to limit such adjustment so as to prevent said slide during rotation thereof from contacting said casting.

As will now be seen, the slide 8 may be variably adjusted diametrically of the worm gear 4 into different set positions through the medium of the adjusting screw 9 and lock nut 11 to dispose the stud 11'' in axially offset relation to the axis of rotation of said gear, whereby said stud 11'' may be caused to describe circles of different diameters under rotation of said gear. Obviously since the milling attachment C is mounted on the stud 11'' the milling tool C' will be caused to cut in a path corresponding to that followed by said stud, i. e., that of a perfect circle, the slides 12 and 13 reciprocating in their respective guides 12' and 13' to function as compensating bearings for supporting the stud 11'' and hence the milling attachment C. As will also be manifest, the diameter of the circle followed by the tool C' will be twice the distance between the axes of the stud 11'' and the gear 4.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An attachment for milling machines including an arbor; a casting, an arbor attachable shaft in the casting, a worm on the shaft, a worm gear mounted in the casting and meshing with the first-mentioned worm, a slide on one side of the second-mentioned gear, a second and third slide operative at right angles to each other, and means on the last-mentioned slide for supporting a milling attachment.

2. An attachment for milling machines including an arbor; a casting, an arbor attachable shaft in the casting, a worm on the shaft, a worm gear mounted in the casting and meshing with the first-mentioned worm, a slide on one side of the second-mentioned gear, a second and third slide operative at right angles to each other, and means on the last-mentioned slide for supporting a milling attachment, and adjusting means for the first-mentioned slide.

3. An attachment for milling machines including an arbor; a casting, an arbor attachable shaft in the casting, a worm on the shaft, a worm gear mounted in the casting and meshing with the first-mentioned worm, a slide on one side of the second-mentioned gear, a second and third slide operative at right angles to each other, and means on the last-mentioned slide for supporting a milling attachment, and stop means for the first-mentioned slide.

4. An attachment for milling machines including an arbor; a casting, an arbor attachable shaft in the casting, a worm on the shaft, a worm gear mounted in the casting and meshing with the first-mentioned worm, a slide on one side of the second-mentioned gear, a second and third slide operative at right angles to each other, and means on the last-mentioned slide for supporting a milling attachment, said second and third-mentioned slides being dovetailed together at right angles.

5. An attachment for milling machines including an arbor; a casting, an arbor attachable shaft in the casting, a worm on the shaft, a worm gear mounted in the casting and meshing with the first-mentioned worm, a slide on one side of the second-mentioned gear, a second and third slide operative at right angles to each other, and means on the last-mentioned slide for supporting a milling attachment, said casting being provided with detachable connecting means for connecting the casting to a conventional milling machine.

6. A milling machine including an arbor; a casting, an arbor attachable shaft in the casting, a worm on the shaft, a worm gear mounted in the casting and meshing with the first-mentioned worm, a slide on one side of the second-mentioned worm gear, a second and third slide operative at right angles to each other, and means on the last-mentioned slide for supporting a milling attachment.

7. A milling machine including an arbor; a casting, an arbor attachable shaft in the casting, a worm on the shaft, a worm gear mounted in the casting and meshing with the first-mentioned worm, a slide on one side of the second-mentioned worm gear, a second and third slide operative at right angles to each other and means on the last-mentioned slide for supporting a milling attachment, and adjusting means for the first-mentioned slide.

8. A milling machine including an arbor; a casting, an arbor attachable shaft in the casting, a worm on the shaft, a worm gear mounted in the casting and meshing with the first-mentioned worm, a slide on one side of the second-mentioned worm gear, a second and third slide operative at right angles to each other and means on the last-mentioned slide for supporting a milling attachment, and stop means for the first-mentioned slide.

9. A milling machine including an arbor; a casting, an arbor attachable shaft in the casting, a worm on the shaft, a worm gear mounted in the casting and meshing with the first-mentioned worm, a slide on one side of the second-mentioned worm gear, a second and third slide operative at right angles to each other, and means on the last-mentioned slide for supporting a milling attachment, said second and third-mentioned slides being dovetailed together at right angles.

10. A milling machine including an arbor; a casting, an arbor attachable shaft in the casting, a worm on the shaft, a worm gear mounted in the casting and meshing with the first mentioned worm, a slide on one side of the second-mentioned worm gear, a second and third slide operative at right angles to each other, and means on the last-mentioned slide for supporting a milling attachment, and a detachable connection between the casting and the milling machine proper.

ALBERT A. DAVIS.